United States Patent [19]

Chevillat et al.

[11] Patent Number: 4,615,004
[45] Date of Patent: Sep. 30, 1986

[54] MICROPROCESSOR INCLUDING MEANS FOR CONCURRENTLY COPYING ALU RESULTS INTO SELECTED OPERAND REGISTER SUBSETS AND AT LEAST ONE MAIN MEMORY LOCATIONS

[75] Inventors: Pierre R. Chevillat, Adliswil; Hans P. Kaeser, Thalwil; Dietrich G. U. Maiwald, Waedenswil; Gottfried Ungerboeck, Langnau am Albis, all of Switzerland

[73] Assignee: International Business Machines Corporation, Armonk, N.Y.

[21] Appl. No.: 681,047

[22] Filed: Dec. 13, 1984

Related U.S. Application Data

[63] Continuation of Ser. No. 373,071, Apr. 29, 1982, abandoned.

[30] Foreign Application Priority Data

Aug. 19, 1981 [EP] European Pat. Off. ........ 81106430.2

[51] Int. Cl.[4] ............................................. G06F 13/00
[52] U.S. Cl. .................................................. 364/200
[58] Field of Search ... 364/200 MS File, 900 MS File

[56] References Cited

U.S. PATENT DOCUMENTS

| 4,048,481 | 9/1977 | Bailey, Jr. et al. | 364/200 X |
| 4,086,626 | 4/1978 | Chung | 364/200 |
| 4,106,090 | 8/1978 | Erickson et al. | 364/200 |

Primary Examiner—James D. Thomas
Assistant Examiner—David L. Clark
Attorney, Agent, or Firm—R. Bruce Brodie

[57] ABSTRACT

A microprocessor having a single common data bus (17) to which the output (33) of the arithmetic-logic unit (11) as well as input and output of the data memory (13) are connected without intermediate buffer registers. Of the working registers (21, 23, 25, 27) connected to the ALU inputs, one group (21, 23) is loaded from the common data bus and the other group (25, 27), used as accumulators, is directly loaded from the ALU output. Specific control circuitry (51, 53, 55, 57, 59, 61) allows selective storing of ALU output values into accumulators (25, 27), and simultaneous transfer with selective scaling into another register and into an addressed memory location within the same cycle during which the instruction was executed.

1 Claim, 6 Drawing Figures

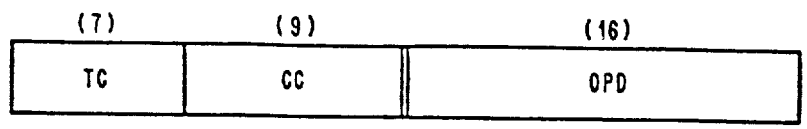
FIG. 2A　　　　　　INSTRUCTION FORMAT
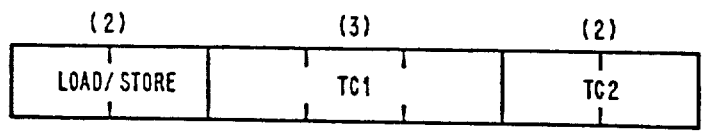
FIG. 2B　　　　　　TRANSFER CODE TC
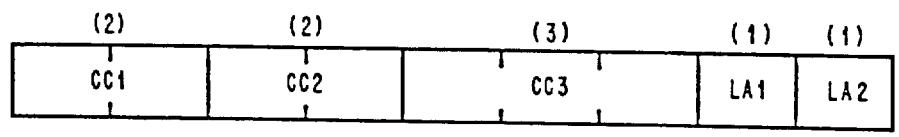
FIG. 2C　　　　　　COMPUTATION CODE CC
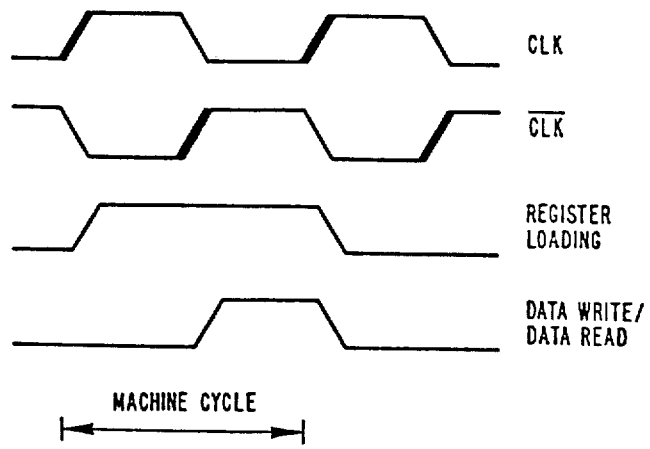
FIG. 3　　　　　　TIMING SIGNALS

LOGIC CIRCUITRY 61

MICROPROCESSOR INCLUDING MEANS FOR CONCURRENTLY COPYING ALU RESULTS INTO SELECTED OPERAND REGISTER SUBSETS AND AT LEAST ONE MAIN MEMORY LOCATIONS

This is a continuation of application Ser. No. 373,071 filed Apr. 29, 1982, now abandoned.

TECHNICAL FIELD

This invention relates to microprocessors, and more particularly to the transfer and distribution of results of arithmetic/logic operations therein which are required for further processing.

BACKGROUND OF THE INVENTION

In the prior art, microprocessors have utilized bus and buffer configurations for distributing ALU results to various points therein. Such results have required several microprocessor machine cycles. The following examples illustrate this diversity.

The article "Microprogramming: Perspective and Status" by A. K. Agrawala et al., published in IEEE Transactions on Computers, Vol. C-23, No. 8, August 1974, pp. 817–837 is a survey of several processor designs. In FIG. 11 of this article, a processor is shown in which the ALU output is connected through a shifter to a data bus to which also several working registers and a memory data register are attached. Working register outputs are connected to ALU inputs by means of additional data buses. In FIG. 13 showing another processor, the ALU output bus is connected directly to general registers, through a shifter to an ALU input bus, and to a main memory data bus. General register outputs are connected either directly or through a shifter to the ALU inputs via data buses. In both processors, memory addresses and data must be transferred over the same ALU output bus.

An article by H.-M. D. Toong "Microprocessors", published in Scientific American, September 1977, pp. 146–161, shows a similar arrangement. It has only a single common data bus which is used for both, data and addresses. ALU results are returned to the accumulator.

U.S. Pat. Nos. 4,047,247 and 4,079,451 disclose data processing systems in which data paths are provided for connecting the output of an adder to an internal bus and via a multiplexer/shifter to several working registers, and for connecting the internal data bus and the working registers to inputs of the adder. The memory is connected to an external bus via the internal bus but both, data and addresses must be transferred to the memory over the same internal bus.

In the Intel MCS-85 User's Manual, published September 1978, a block diagram of the 8085 A CPU is shown in FIG. 2-1. It includes an ALU whose output is connected via an internal data bus to two working registers associated with the ALU inputs, and to a register array. Buffers separate the internal data bus from the memory data and address bus.

A signal processor is described in the publications "V-MOS chip joins microprocessor to handle signals in real time" by R. W. Blasco, Electronics, Aug. 30, 1979, pp. 131–138, and "Schnelles Rechenwerk erweitert Mikroprozessor-Systeme" W" by W. E. Nicholson et al., Elektronik 1979, No. 4, pp. 53–60. In this processor, the output of an adder/subtractor is always stored into an accumulator. Contents of the accumulator can be transferred to a memory or to a scratchpad, via a shifter to one input of the adder/subtractor, and to a multiplier whose output is connected to the other adder/subtractor input. Data paths are provided from the memory to the multiplier and to both adder/subtractor inputs.

Chung, U.S. Pat. No. 4,086,626, issued Apr. 25, 1978, discloses and claims a microprocessor formed from a unitary CPU chip absent a program counter and at least one unitary RAM chip including a program counter. A multimemory configuration permits multiprocessing using a single clock since instruction streams can be drawn from each RAM whose extraction cycle is controlled by strobing the local program counter from the single clock.

THE INVENTION

It is an object of the present invention to devise a microprocessor of improved flexibility in the manipulation of data, in particular in the transfer and distribution of results of arithmetic/ logic operations which are required for further processing. It is another object to speed up operation of a microprocessor by saving machine cycles heretoforth necessary for data transfer and storing operations.

These objects are achieved by improving the means for interconnecting ALU, memory, and registers, and by providing the necessary control signals to select connecting paths and registers for optimal data transfers within one machine cycle.

In particular, improved operation is achieved by the following: Any ALU output can be simultaneously stored into selectable accumulator registers, into an ALU input register, and into a specific storage location in the addressable memory; no intermediate storing or latching of ALU outputs is effected so that no extra cycle is required for transferring the result of an arithmetic operation to a register or to memory; any ALU output can be transferred unchanged to an accumulator register and at the same time, by means of an additional shifting multiplexer, with selective scaling to the memory and/or to an ALU input register. While the prior art, especially Chung, describes an ALU bus coupling a pair of registers, there does not appear to be any teaching or suggestion of using the operating code portion of an instruction to select the subset of registers including addressable memory to directly copy the ALU operands into.

An embodiment of a microprocessor according to the invention is described in the following in connection with drawings.

BRIEF DESCRIPTION OF THE DRAWING

FIG. 2A shows the instruction format of the microprocessor of FIG. 1;

FIG. 2B shows the partitioning of the transfer code in an instruction which allows simultaneuous control of separate transfer functions;

FIG. 2C shows the partitioning of the computation code in an instruction which allows separate selection of ALU functions and of input registers and accumulator registers;

FIG. 3 shows the processor clock signals and the relative timing of register load operations, and of data write and data read operations;

DESCRIPTION OF THE PREFERRED EMBODIMENT AND INDUSTRIAL APPLICABILITY

Figure 1:
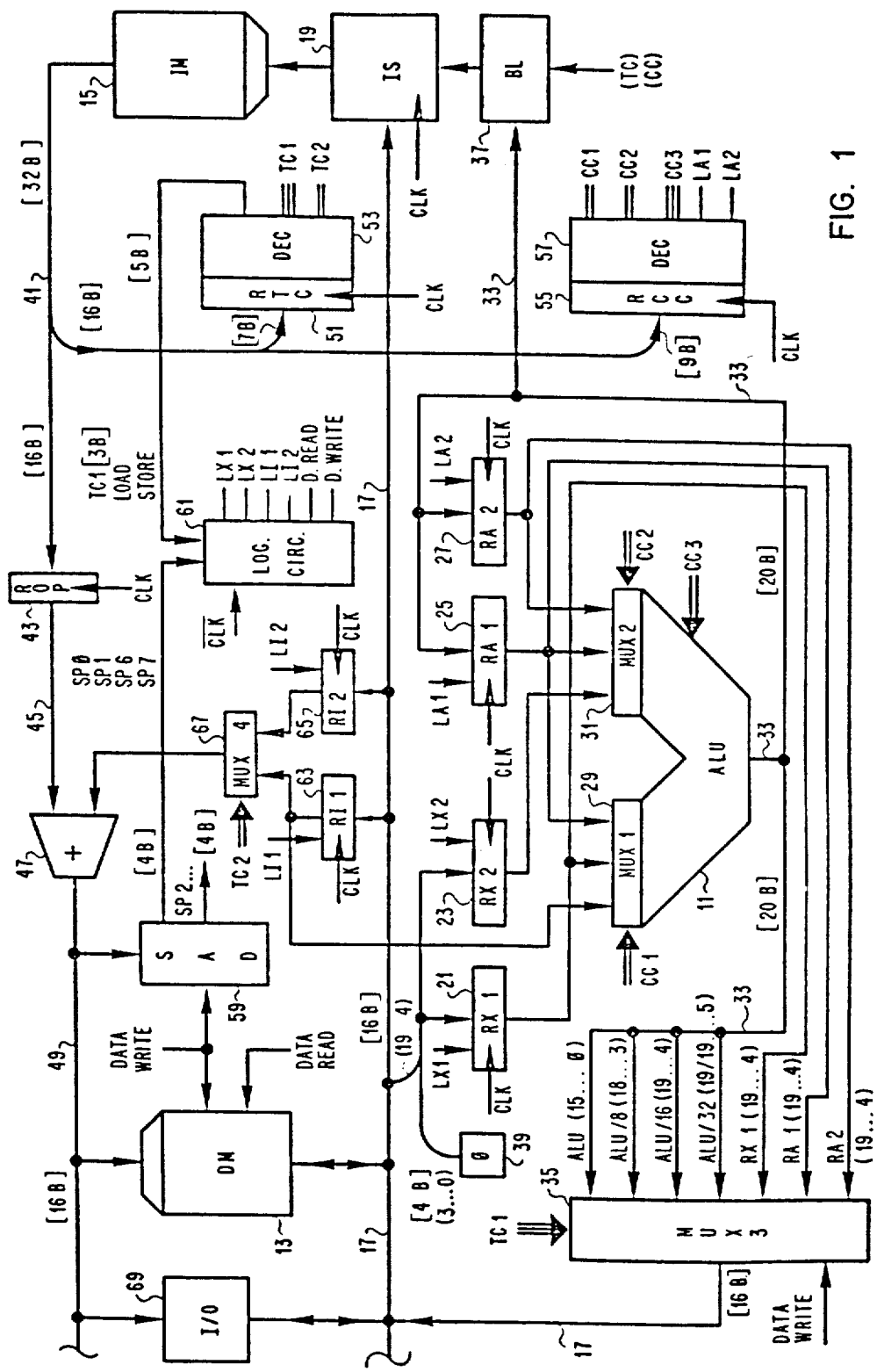
FIG. 1 is a block diagram of the microprocessor showing its functional units, their interconnections, and control signals.

FIG. 1 shows a block diagram of a microprocessor incorporating the invention. It should be noted that path widths of buses and widths of registers, ALU, multiplexers etc. as well as numbers of registers given in present embodiment are only illustrative. Other values could be chosen arbitrarily for embodying the invention in different situations. Main units of the microprocessor are an arithmetic-logic unit (ALU) 11, a data memory (DM) 13, and an instruction memory(IM) 15. A common 16-bit wide data bus 17 is provided for transferring data to and from data memory 13, to and from ALU 11, and to an instruction sequencer 19 which addresses instruction memory 15.

ALU 11 has a width of 20 bits. Provided with it are two computational input registers RX1 (21) and RX2 (23), and two accumulator registers RA1 (25) and RA2 (27), each having a capacity of 20 bits. These registers are connected to the two ALU inputs by two multiplexers MUX1 (29) and MUX2 (31) as shown in the drawing. There could be more than two registers in each set, but to simplify the description only two are shown in this embodiment.

ALU output bus 33 is 20 bits wide. Its bit lines are connected selectively through a multiplexer MUX3 (35) to data bus 17. ALU output bus 33 is further connected to the input of both accumulator registers RA1 and RA2, and to the input of branch logic 37 which in response to the data conditions on ALU output bus 33 furnishes branch control signals to instruction sequencer 19.

Computational input registers RX1 and RX2 have their 16 most significant input lines (19 . . . 4) connected to data bus 17, whereas their four least significant input lines (3 . . . 0) are connected to circuitry 39 which permanently furnishes a zero signal to these four lines.

Outputs of registers RX1, RA1 and RA2 are also connected through multiplexer MUX3 to data bus 17, but only their 16 most significant bit lines (19 . . . 4). The function of MUX3 will be explained later in more detail.

Instruction words in instruction memory 15 are 32 bits wide, as shown in FIG. 2A. As will be explained in more detail in a subsequent section, each instruction comprises a 16-bit operand address (OPD), and 16 bits of operation code which are separated into a 7-bit transfer code (TC) and a 9-bit computation code (CC).

Instruction memory 15 has a 32-bit output bus 41. 16 bit lines are connected to an operand address register ROP (43). Its output is connected via 16 bit lines 45 and an adder 47 providing address modification to the 16-bit address bus 49 of data memory 13.

Seven bit lines of instruction memory output bus 41 are connected to a transfer code register RTC (51) which is combined with a decoder 53. Control signals for data transfer operations are generated on the output lines of decoder 53 in response to transfer codes available in RTC 51. They will be explained later in more detail.

The nine remaining bit lines of instruction memory output bus 41 are connected to a computation code register RCC (55) which is combined with a decoder 57. Control signals for computation operations (and for the selection of registers participating in a computation operation) are generated on the output lines of decoder 57 in response to computation codes available in RCC 55. They will be explained later in more detail.

A particular unit in the present microprocessor is special address decoder 59. It is connected to memory address bus 49 and furnishes at its output lines in response to particular addresses, register select signals to allow simultaneous storing of data present on the data bus into a register and into an addressed memory location.

Figure 4:
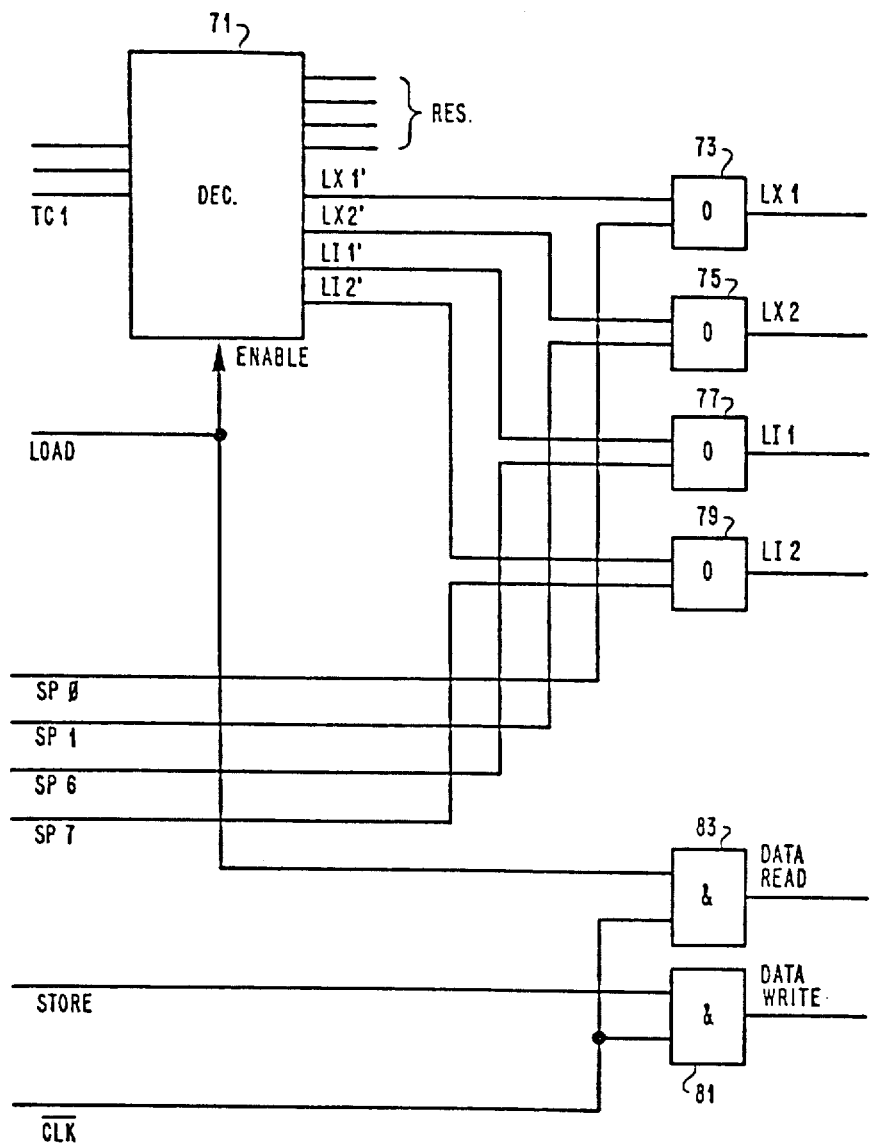
FIG. 4 is a block diagram of logic circuitry for combining control signals to obtain single select signals for certain registers, and to obtain dynamic data write and data read signals.

Control signals from special address decoder 59 and those control signals from TC decoder 53 which select registers for storing data, are combined in logic circuitry 61 so that a single combined register select signal for each register is furnished at the output of circuitry 61. Further elements of circuitry 61 serve for strobing a STORE and a LOAD control signal by the system clock signal to obtain a DATA WRITE and a DATA READ signal. Details of logic circuitry 61 are shown in FIG. 4 and will be explained later.

It is to be noted that the control signal outputs of decoders 53 and 57 and of logic circuitry 61, and the respective control signal inputs of registers RX1, RX2, RA1, RA2, of the ALU, of multiplexers MUX1, MUX2, MUX3, of the data memory and of registers RI1, RI2 and multiplexer MUX4 (to be explained in the sequel) are not connected in the drawing to enhance clarity. Each control signal output and its respective input can easily be associated by the signal designations. Further explanations and signal listings will be presented later.

Two index registers RI1 (63) and RI2 (65), both 16 bits wide, are connected to data bus 17. Their outputs can be gated selectively by a 16-bit multiplexer MUX4 (67) to the input of adder 47 for operand address modification. Contents of RI1 can also be gated to ALU 11 through multiplexer MUX1.

I/O units such as A/D and D/A converters, timer, I/O registers etc. are shown as a single block 69 in the drawing. The I/O units are connected to data bus 17 and to address bus 49 so that they can be selected like memory locations if respective addresses are reserved for them in the available address space.

INSTRUCTION FORMAT, TRANSFER FUNCTIONS AND COMPUTATION FUNCTIONS

To enhance the understanding of the functions and operation of the microprocessor units presented in the above overview, the instruction format, the transfer functions and the computation operations which are controlled by the transfer code TC and the computation code CC will be explained in this section. The specific formats presented here are only illustrative and can be varied according to existing requirements.

The instruction format is shown in FIG. 2A as mentioned above. It comprises a 16-bit operand address used for memory access but also for selecting I/O units and certain registers during STORE operations. This field can of course be used also as direct operand but respective circuitry and control lines are not shown to simplify the description.

The 7-bit transfer code and the 9-bit computation code separately control various functions as will be explained in the sequel.

Basically, the TC bit group as well as the CC bit group could be coded as a whole, thus allowing to distinguish $2^7$ different TC code words and $2^9$ CC code words. In the present embodiment, both TC and CC are subdivided into independent bit fields thus reducing the maximum number of possible different functions, but simplifying control decoding and allowing to control several functions simultaneously.

Transfer Code TC, FIG. 2B

The seven bits of TC are used as follows:

| Bits 1-2 LOAD/STORE | Decoded in RTC Decoder (4 choices). Selecting Transfer Function. | 0 = - RES -<br>01 = LOAD (from memory)<br>10 = STORE<br>11 = - RES - |
|---|---|---|

The RESERVED code combinations may be used for selecting two further functions, e.g. LOAD DIRECT OPERAND, or BRANCH.

| Bits 3-5 TC1 | For LOAD (from memory) | 000 = Load RX1 |
|---|---|---|
| | Decoded in Logic Circuitry 61 (8 choices). Selecting Register to be loaded. | 001 = Load RX2<br>010 = - RES -<br>011 = - RES -<br>100 = Load RI1<br>101 = Load RI2<br>110 = - RES -<br>111 = - RES - |
| | For STORE | 000 = ALU OUT 15-0 |
| | Decoded in MUX3 (8 choices). Selecting Source for Data Bus. | 001 = ALU OUT 18-3<br>010 = ALU OUT 19-4<br>011 = ALU OUT 19, 19-5<br>100 = RX1<br>101 = RA1<br>110 = RA2<br>111 = - RES - |

For LOAD (from memory) operations, four additional registers connected to the data bus could be selected (e.g. further ALU input registers or further index registers). For STORE operations, one additional source could be selected for providing data to the data bus (e.g. a scaled output from RX1, or from RA1 or RA2).

| Bits 6-7 TC2 | Decoded in MUX4 (4 choices). Selecting Index Register for Address Modification. | 00 = forced ZERO<br>01 = Use RI1<br>10 = Use RI2<br>11 = - RES - |
|---|---|---|

Computation Code CC, FIG. 2C

The nine bits of CC are used as follows:

| Bits 1-2 CC1 | Decoded in ALU Input MUX1. Selection of Source for first ALU Input. | 00 = - RES -<br>01 = RX1<br>10 = RA1<br>11 = RI1 |
|---|---|---|
| Bits 3-4 CC2 | Decoded in ALU Input MUX2. Selection of Source for second ALU Input. | 00 = - RES -<br>01 = RX2<br>10 = RA1<br>11 = RA2 |
| Bits 5-7 CC3 | Decoded in ALU. Selection of Arithmetic/ Logic Function | 000 = - RES -<br>001 = INP.2 − INP.1 (SUBTR.)<br>010 = INP.1 − INP.2 (SUBTR.)<br>011 = INP.1 + INP.2 (ADD)<br>100 = INP.1 V INP.2 (EX-OR)<br>101 = INP.1 V INP.2 (OR)<br>110 = INP.1 ∧ INP.2 (AND)<br>111 = - RES - |
| Bit 8 LA1 | Used directly | Selection of Accu RA1 for loading from ALU output |
| Bit 9 LA1 | Used directly | Selection of Accu RA2 for loading from ALU output |

Many other solutions can be chosen for the format and decoding of TC and CC, but the embodiment as described here is sufficient to explain the present invention.

TIMING

All control signals provided at decoder outputs, such as TC1, CC2, STORE etc., as well as all register output signals are static, i.e. they become available once the respective register has reached a quiescent state after loading, and remain available until the register is newly loaded.

These static signals are strobed by a clock signal CLK for loading registers etc. Registers connected to the data bus such as RX1, and also the accumulator registers such as RA1, have n parallel inputs for static n-bit data signals, a control input for a static control signal enabling the respective register, and a clock input. A positive transition of the clock signal will cause loading of the data available at the data input into the register if it is enabled by the respective control signal.

Registers connected to the instruction memory input (ROP, RTC, RCC) are always loaded by a positive clock signal transition without any further enabling or additional control signal.

The clock signal is provided in true and in complementary form as shown in FIG. 3. Positive transitions of the true clock signal CLK are used to effect register loading as described above. Positive transitions of the complementary clock signal $\overline{CLK}$ are used to strobe the static STORE and READ signals to develop dynamic DATA WRITE and DATA READ pulses. Thus, registers are always loaded during the first half of a clock cycle, whereas data are written into or read from data memory during second half of a clock cycle.

DETAILS AND OPERATION OF FUNCTIONAL UNITS

Details of the functions and operation of the several functional units of the microprocessor will be presented in this section.

Instruction Memory/Instruction Sequencer/Branch Logic

A read/write random-access memory may be used for the instructions, i.e. for the programs of the microprocessor. For the present embodiment, however, a read-only memory containing fixed programs is used. Instruction memory 15 is addressed by instruction sequencer 19. An initial address can be transferred to the instruction sequencer via data bus 17 for selecting the start of a specific routine. The clock signal applied to the instruction sequencer steps through consecutive addresses. Branch logic 37 can interrupt the sequence and force a branch to another address under certain conditions, e.g. when the ALU output is all zeros, or when an ALU overflow occurs. Branch logic 37 can be conditioned by the presence of a specific TC or CC code, or it could be connected to a particular condition register (not shown).

Instructions read from instruction memory 15 are 32 bits wide and are distributed to registers ROP (43), RTC (51), and RCC (55) as was mentioned earlier. These registers are loaded in every machine cycle with the positive transition of the clock pulse (cf. FIG. 3). Hence, instructions are prefetched in one machine cycle and executed in the next cycle (pipelining).

RTC Register and TC Decoder

RTC Register 51 is seven bits wide for storing one transfer code TC. Decoder 53 just transfers the five last bits, i.e. TC1 (3 bits) and TC2 (2 bits) from RTC to the respective five decoder output lines. The two first bits of TC, i.e. the LOAD/STORE bits, are decoded to obtain two (of four possible) output signals LOAD and STORE, as is indicated in the table.

Special Address Decoder

Decoder 59 decodes four (of eight possible) predetermined addresses to obtain store register select control signals SP-0, SP-1, SP-6, and SP-7. The special address decoder is enabled, however, only when the control signal DATA WRITE is active during a store operation. Thus, any of these register select signals can only be activated when data are stored into memory for simultaneously storing the same data in the respective register, but none of these register select signals can be activated during a memory read.

Logic Circuitry for Control Signal Combination

Logic circuitry 61 is provided for combining control signals from decoders 53 and 59. It comprises a number of OR gates and AND gates and is shown as block diagram in FIG. 4.

A decoder 71 receives the three bits of TC1, as well as the general LOAD (from memory) control signal from RTC decoder 53, and furnishes four (of eight possible) load register select signals LX1', LX2', LI1', LI2', but only when it is enabled by an active general LOAD signal.

OR gates 73, 75, 77, and 79 each combine the load register select signal for one register (LX1', LX2', LI1', LI2',) and the store register select signal for the same register (SP0, SP-1, SP-6, and SP-7 respectively) to generate a single select control signal (LX1, LX2, LI1, LI2) for each of the four registers RX1, RX2, RI1, and R12. Thus when, e.g. control signal LX1 is active, register RX1 is enabled to load/store the data furnished to its input via the data bus. Actual loading/storing is effected when the next positive clock pulse transition occurs. In the same way, LX2 enables loading/storing in RX2, LI1 in RI1, and LI2 in R12.

An AND gate 81 is provided for strobing the static STORE signal with a transition of the complementary clock pulse $\overline{CLK}$ to obtain a DATA WRITE control signal. Thus, when a STORE command was given, actual writing of data into data memory 13 is effected only during the second half of a machine cycle by the DATA WRITE pulse. This pulse also enables special address decoder 59 as was mentioned earlier, and it also enables multiplexer 35 (MUX3) which will be explained later.

The general LOAD control signal from TC decoder 53 is strobed in AND gate 83 with a transition of complementary clock signal $\overline{CLK}$ to obtain the DATA READ control signal. A DATA READ pulse is transferred to data memory 13 when data are to be fetched for loading one of the registers 21, 23, 63, and 65. Like DATA WRITE operations, also DATA READ operations are effected in the second half of a machine cycle.

RCC Register and CC Decoder

RCC Register 55 is nine bits wide for storing one computation code CC. Decoder 57 in the present embodiment directly transfers these nine bit values to its nine output lines CC1 (2), CC2 (2), CC3 (3), LA1 (1), and LA2 (2). The two load control bits LA1 and LA2 could be used in encoded form, but in present embodiment they serve as separate load control signals.

Computation Registers and Index Registers

Computation Registers RX1, RX2, RA1 and RA2, each 20 bits wide, and index registers RI1 and RI2, each 16 bits wide, are each enabled by a single separate control signal, furnished by the decoders as described above, to store/load the data word at their input bus when the signal CLK at the clock input has a positive transition. Their outputs are connected to multiplexers 29, 31, 35, and 67, respectively to gate their contents selectively to inputs of ALU 11, to data bus 17 (computation registers) or to address modification adder 47 (index registers), respectively.

MUX1 and MUX2

The two ALU input multiplexers MUX1 (29) and MUX2 (31) are each 20 bits wide and have their outputs directly connected to the respective 20-bit ALU inputs. Both comprise a decoder for decoding the two-bit arithmetic register selection control bit groups CC1 and CC2, respectively. The code assignments were already presented in a table of the instruction format section of this specification.

Selection of the first operand source, of the second operand source and of the arithmetic-logic function performed are independent of each other due to the computation code format and handling.

ALU

Function and control of ALU 11 are self-evident from the table presented when the computation code format was explained so that no further description appears necessary.

MUX3

ALU output multiplexer MUX3 (35) is an important unit. It is 16 bits wide, has seven (of eight possible) 16-bit inputs and comprises a three-bit decoder for transfer code portion TC1, to select one of the seven inputs. The static output signals of MUX3 are only gated to data bus 17 when the DATA WRITE control pulse occurs.

The first four inputs of MUX3 are each connected to 16 different selected bit lines of the 20 bit lines of ALU output bus 33, as indicated in FIG. 1. The first input (bit 15-0) receives the actual ALU output, the second input (bits 18-3) receives the ALU output shifted by three positions, i.e. divided by eight. The third and fourth inputs receive the ALU output shifted by four or five positions, respectively, i.e. divided by 16 and 32, respectively. For input four, the first bit of the ALU output, i.e. bit 19 which is the sign bit, is duplicated to obtain the necessary 16 bits.

The remaining three inputs of MUX 3 are connected to the 16 most significant bit output lines (19 . . . 4) of registers RX1, RA1, and RA2, respectively, so that contents of these registers can be transferred to the data bus without using the ALU.

MUX4

16-bit multiplexer MUX4 (67) serves for gating the contents of either RI1 or RI2 to adder 47 in response to the 2-bit group TC2 which is decoded within the multiplexer.

EXAMPLES FOR COMBINED TRANSFER OPERATIONS

In the following, a few examples will be given to illustrate the efficiency of the present microprocessor for simultaneously executing certain data transfer and handling functions within a single machine cycle thus saving time and increasing overall performance.

(1) Register Swapping

It is possible to exchange the contents of two registers, i.e. one of the input registers RX1, RX2 and one of the accumulator registers RA1, RA2 within one cycle, i.e. by a single instruction. Other microprocessors would need an additional register or a data memory location for intermediate storage of data and would consequently require more than one machine cycle to exchange the register contents.

The instruction for swapping specifies the following two operations:

(a) A transfer operation for storing the contents of accumulator RA1 into the memory location which is the duplication of register RX1, i.e. the memory location having an address which automatically selects register RX1.

(b) An arithmetic operation which adds the contents of input register RX1 (gated to ALU input 1) to zero (nothing gated to ALU input 2), and which stores the result into accumulator RA1.

The following is combined in the respective instruction:

(a) For transfer operation:
In TC:
  Load/Store field specifying STORE=10
  TC1 specifying RA1 as data bus source=101
  TC2 specifying no index register=00
As Operand: The memory address associated with register RX1, e.g. 256=0000'0001'0000'0000
(b) For arithmetic operation:
In CC:
  CC1 Selecting RX1=01
  CC2 Selecting NONE=00
  CC3 Specifying ADD=011
  LA1 Selecting RA1=1
  LA2 NOT selecting RA2=0

Thus, the complete instruction word having contents TC+CC+OPD=Load/-Store+TC1+TC2+CC1+CC2+CC3+LA1+LA2-+OPD is represented by the following bit sequence:

| 10'101'00 | / | 01'00'011'1'0 | / | 0000'0001'0000'0000. |
|---|---|---|---|---|
| TC | | CC | | OPD |

(2) Modifying Index Register Contents and Storing the New Index Value Simultaneously into Memory The contents of any one of the index registers can be modified by the contents of one input register RX1, RX2, and the result, i.e. the new index value, stored back into the respective index register and also into its associated memory location (e.g. for later testing this value), all this by one instruction within one machine cycle.

The instruction specifies the following operations:

(a) An arithmetic operation for adding the contents of RX2 to the contents of RI1

(b) A transfer operation for storing the result from the ALU output into the memory location which has the address that automatically selects also register RI1.

The following is combined in the respective instruction:

(a) For arithmetic operation:
In CC:
  CC1 selecting RI1=11
  CC2 selecting RX2=01
  CC3 specifying ADD=011
  LA1 NOT selecting=0
  LA2 NOT selecting=0
(b) For transfer operation:
In TC
  Load/Store field specifying STORE=10
  TC1 specifying normal ALU output as data bus source=000
  TC2 specifying no index register=00
As operand: The memory address associated with index register RI1, e.g. 260 =0000'0101'0000'0000

The complete instruction word will look as follows:

| 10'000'00 | / | 11'01'011'0'0 | / | 0000'0101'0000'0000 |
|---|---|---|---|---|
| TC | | CC | | OPD |

(3) Filter Operation

In filter operations, e.g. using a transversal filter, the filter output is computed by successive accumulation, and the delay line contents have to be moved. For doing this jointly, an instruction specifying the following operations can be used:

(a) An arithmetic operation for adding the contents of RX1 and RX2 and storing the result into accumulator RA1.

(b) A transfer operation for storing one filter content value from register RX1 into the next memory location.

In the present embodiment the following is combined in the respective machine instruction:

(a) For arithmetic operation:
In CC:
    CC1 Selecting RX1=01
    CC2 Selecting RX2 01=01
    CC3 Specifying ADD=011
    LA1 Selecting=1
    LA2 NOT Selecting=0
(b) For transfer operation:
In TC:
    Load/Store field specifying STORE=10
    TC1 specifying RX1 output as data bus=100 source
    TC2 specifying no index register=00
As Operand: specifying the next memory address e.g. 27=0000'0000'0001'1011

The complete instruction word will have the bit representation:

| 10'100'00 | / | 01'01'011'1'0 | / | 0000'0000'0001'1011 |
|---|---|---|---|---|
| TC | | CC | | OPD |

(4) Butterfly Operation

In Fast Fourier Transforms (FFT) basic butterfly operations have to be performed. In these, the sum and difference of two values have to be computed and the results stored back into the memory for further usage.

The following operations have to be done:

(a1) The arithmetic operation for adding the contents of register RX1 and accumulator RA1.

(b1) A transfer operation for storing the result from the ALU output into the memory location specified by index register RI1.

(a2) An arithmetic operation for subtracting the content of accumulator RA1 from register RX1.

(b2) A transfer operation for storing the result from the ALU output into the next memory location specified by index register RI1 and the operand field.

In the present embodiment this leads to the following two machine instructions:

(a1) For arithmetic operation:
In CC:
    CC1 Selecting RX1=01
    CC2 Selecting RA1=10
    CC3 Specifying ADD=011
    LA1 NOT Selecting=0
    LA2 NOT Selecting=0
(b1) For transfer operation:
In TC:
    Load/Store field specifying STORE=10
    TC1 specifying scaled ALU output as=010 data bus source
    TC2 specifying RI1=01 as memory index pointer
As operand: Specifying ZERO=0000'0000'0000'0000

(a2) For arithmetic operation:
In CC:
    CC1 selecting RX1=01
    CC2 selecting RA1=10
    CC3 specifying SUBTR=010
    LA1 NOT selecting=0
    LA2 NOT selecting=0
(b2) For transfer operation:
In TC:
    Load/Store field specifying STORE=10
    TC1 specifying scaled ALU output=010 as data bus source
    TC2 specifying RI1=01 as memory index pointer
As operand: specifying ONE=0000'0000'0000'0001 e.g. the next memory address The two complete instruction words will have the following bit representation:
First instruction:

| 10'010'01 | / | 01'10'011'0'0 | / | 0000'0000'0000'0000 |
|---|---|---|---|---|
| TC | | CC | | OPD |

Second instruction:

| 10'010'01 | / | 01'10'010'0'0 | / | 0000'0000'0000'0001 |
|---|---|---|---|---|
| TC | | CC | | OPD |

Note, that in the present microprocessor the results can directly be stored into the memory without destroying any register contents. Hence, the two values for the computation have to be loaded only once into the registers.

We claim:

1. A microprocessor having a memory for storing sequences of instructions and data, each instruction including an operation and address part; a decoder responsive to an instruction for generating control signal and address outputs; an arithmetic logic unit for combining operands stored in one or more of a plurality of operand registers; means responsive to the outputs from the decoder for extracting instructions from the memory and applying the extracted instructions to the decoder; and means for copying operands from one or more of the operand registers to and from the memory, the operand registers, and the arithmetic logic unit; said microprocessor further comprising:

means forming part of the copying means and operatively responsive to the outputs of the decoder for concurrently copying operands constituting combined operands from the arithmetic logic unit to a subset of the operand registers and at least one location in the memory selected as a function of the control signal outputs constituting a decoded operation part of an instruction.

* * * * *